Feb. 2, 1965 R. DIENER 3,168,242
ELECTROMAGNETICALLY OPERATED TEMPERATURE REGULATING SYSTEM
Filed Nov. 5, 1962

INVENTOR:
Rudolf Diener
E. M. Squire
ATTORNEY

United States Patent Office 3,168,242
Patented Feb. 2, 1965

3,168,242
ELECTROMAGNETICALLY OPERATED TEMPERATURE REGULATING SYSTEM
Rudolf Diener, Zurich, Switzerland, assignor, by mesne assignments, to Eldima A.G., Zurich, Switzerland
Filed Nov. 5, 1962, Ser. No. 235,309
4 Claims. (Cl. 236—75)

The present invention relates to a temperature responsive electro-magnetically actuated fluid flow regulating system, for example to a valve for controlling the circulation of water in a central heating plant in accordance with the temperature.

The invention has the primary object of providing an electro-magnetically controlled fluid flow control member the obturator body of which is continuously in stable equilibrium at all possible positions of its working range between fully closed and fully opened limiting positions. It is another object of the invention to provide a fluid flow control system of this character which is free from overregulating and consequential hunting. It is yet another object of the invention to provide a fluid flow control system of the kind referred to which is rapidly responsive even to small variations of temperature.

With these and other objects in view which will become apparent later from this specification and the accompanying drawing, I provide an arrangement for displacing a fluid flow control member comprising in combination: a solenoid coil, a movable armature in operative relationship with said coil, an obturator body or valve member fixedly connected with said armature, a spring biasing said obturator body towards its closing position in opposition to the magnetic force applied to said armature by said solenoid when energized, a current supply device having at least one amplifier connected to said solenoid and, in operation, supplying thereto an energizing current conforming with the spring characteristic of said spring and generating a magnetic force keeping said obturator body in continuously stable equilbrium in all positions thereof.

Preferably, a stationary armature is arranged coaxially with and in juxtaposition to said movable armature within said solenoid coil. Preferably each of said armatures has a pole shoe with at least one annular rib of trapezoidal profile, the frusto-conical surfaces of said pole shoes having the same inclination corresponding to a half-aperture angle not exceeding 15°, representing a maximum angle of convergence not exceeding 30°, and including between themselves at least one air gap of the magnetic circuit, or possibly two such air gaps arranged in parallel in said circuit.

Figure 1:
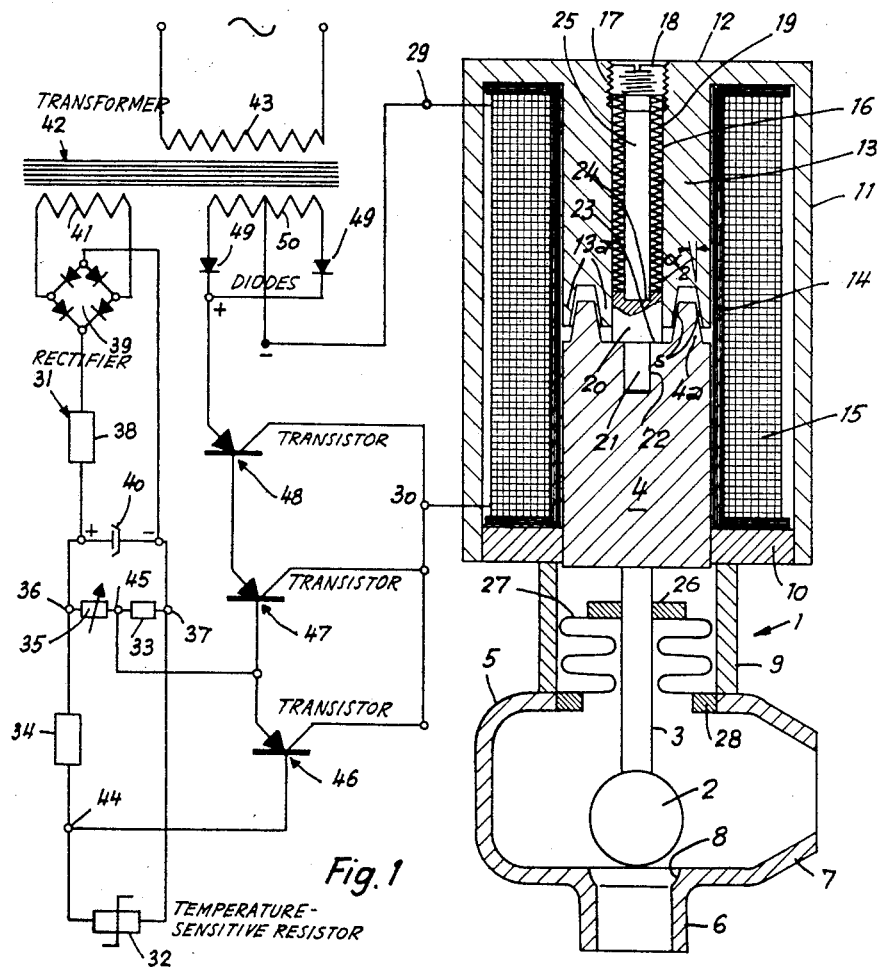
Figure 2:
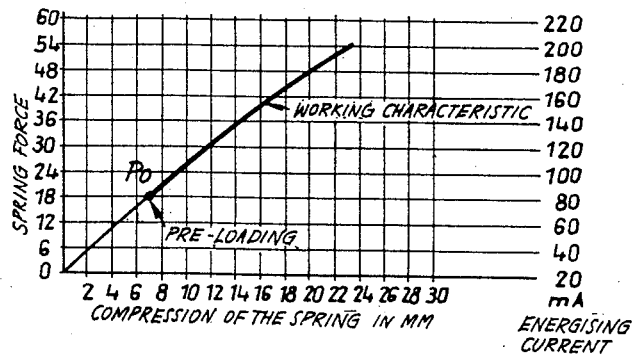

These and other features of my said invention will be readily understood from the following description of a preferred embodiment thereof given by way of example with reference to the accompanying drawing, in which:

FIG. 1 is a longitudinal section of an electromagnetically controlled valve whose solenoid coil is connected with a source of energizing current by the circuit diagram illustrated and FIG. 2 is a graph plotting the spring force biasing said valve (in kilograms) and the energizing current for the solenoid (in milli-amps) against the compression of the biasing spring (in millimetres).

The control arrangement illustrated comprises an electromagnetically controlled valve designated generally as 1, the valve head or obturator body 2, the configuration of which is spherical and is connected by a spindle 3 with a vertically movable cylindrical armature 4. The valve casing 5 has an inlet port 6, an outlet port 7 and a complementary spherical valve seat 8, on which the spherical valve head 2 rests in the closure position.

The valve casing 5 is connected through a cylindrical sleeve 9 with an annular plate 10, which is enclosed by the lower end of a cylindrical housing 11. The housing 11 is closed on top by a cover 12, from which a stationary armature 13 projects inwardly towards the movable armature 4, having the same diameter as the latter. The armatures 4 and 13 are surrounded by a bobbin 14 of insulating material for the solenoid coil 15, the magnetic flux of which is closed by the ferromagnetic components 4, 10, 11, 12 and 13 of the magnetic circuit.

The movable armature 4 has a pole shoe or pole piece formed by an integrally formed annular rib 4a of regular isosceles trapezoidal cross-sectional configuration, which projects upwardly from the upper end face of the armature 4. The stationary armature 13 has a pole shoe formed by two annular ribs 13a, which project downwardly from the lower end face of the armature 13 and define therebetween an annular recess complementary to the rib 4a. The annular ribs 4a and 13a are co-axial with one another and with the axis of the cylindrical solenoid coil 13, and the annular rib 4a, which has a shape defined by a surface of revolution about the longitudinal axis of the coil 15 of a regular isosceles trapezoid and engages in the complementary annular recess between the annular ribs 13a, the profiles of which each have the shape of a symmetrical trapezoid, the inclinations of the frusto-conical sides of the trapezoidal profiles being equal. In other words, the two pole shoes 4a and 13a have two pairs of juxtaposed frusto-conical surfaces, between which there are formed two annular air gaps s which are arranged in parallel in the magnetic circuit.

It will be seen that by an upward movement of the movable armature 4 the (substantially radial) width of the gaps s is reduced, while their (substantially axial) length increases. The inclination of the frusto-conical sides with respect to their axis, i.e. half the aperture angle x of the angle of convergence of the frusto-conical sides with respect to their axis, i.e. half the aperture angle α of the angle of convergence of the frusto-conical surfaces amounts preferably to less than 15°, if desired even less than 10°, corresponding to an angle of convergence in the range from less than 20° to 30°. The described construction of the pole shoes 4a and 13a is of importance for generating a high magnetic force with comparatively small dimensions of the magnetic system, and for attaining a substantially straight-line characteristic (see the graph of FIG. 2).

The stationary armature 13 has a central longitudinal bore 16, the upper end of which is provided with a screw tapping 17, into which a plug 18 is screwed, which serves for regulating the pre-loading ($P_o$; FIG. 2) of a compression spring 19 lying below said plug 18 in the bore 16. The spring 19 is formed of stacked spring washers and bears at the bottom on an abutment 20 which at its lower end has a centering pin 21 engaging into a bore 22 of the armature 4, on which the abutment 20 rests with its shoulder 23. On top of the abutment 20 a recess 24 is provided, into which engages a pin 25 arranged within the spring 19 whose upper end abuts the plug 18, when the valve is opened, i.e. upon an upward movement of the armature 4 connected with the spherical valve head 2, before the pole shoes 13a and 4a contact one another, in order to prevent any "sticking" of these pole shoes to one another. On the valve stem 3 a collar 26 is fixed, which is fixedly connected with the upper end of a resilient metal bellows 27, whose lower end is in turn fixedly connected with a ring 28 arranged on the valve casing 5. The bellows 27 serves for the glandless sealing of the magnetic system.

The solenoid coil 15 is electrically connected with the output terminals 29 and 30 of a device designated generally as 31, which controls the energizing current as a function of a temperature, e.g. the temperature of water flowing through the valve 1, which may be built for example into a central heating installation. For measuring the temperature, a temperature-sensitive resistor 32 is provided, which forms one branch of a Wheatstone bridge, the other branches of which are formed by two fixed resistors 33, 34 and an adjustable resistor 35, respectively.

The input terminals 36 and 37 of the bridge 32–35 are connected through a resistor 38 to a full-wave bridge type rectifier 39, the voltage of which is smoothed out by a capacitor 40 shunted in parallel to the input terminals 36, 37 of the temperature sensing bridge 32, 35. The rectifier 39 is fed by a first secondary winding 41 of a transformer 42, whose primary coil 43 is connected to the alternating current mains.

The output terminals 44 and 45 of the bridge 32–35 are connected to the base and to the emitter, respectively, of a first transistor 46. The emitter of the transistor 46 is connected to the base of a second transistor 47, whose emitter is in turn connected to the base of a third transistor 48. The collectors of the three transistors 46–48 are directly connected to the output terminal 30.

The emitter of the transistor 48 is connected with the positive pole of a full-wave rectifier formed by two diodes 49 and a center-tapped second secondary winding 50 of the transformer 42. The negative pole of the rectifier 49, 50 is connected with the output terminal 29.

The arrangement described operates as follows:

By means of the adjustable resistor 35 the bridge 32–35 is adjusted to a predetermined limit temperature, which when exceeded, should causes the valve 1 to be opened. The potential of the output terminal 45 of the bridge 32–35 is slightly positive with respect to that of the output terminal 44, when the temperature-sensitive resistor 32 is subject to the limit temperature, so that a weak current flows in the emitter-base circuit of the transistor 46, which current is amplified in conventional manner by the transistors 47 and 48, so that e.g. an energizing current of 80 milliamps is supplied by the rectifier 49, 50 to the solenoid coil 15, corresponding to the point Po of the graph according to FIG. 2.

When the temperature rises further, the value of resistance of the resistor 32, which has a negative temperature coefficient, diminishes, and the bridge's output terminal 44 becomes more pronouncedly negative with respect to the bridge's output terminal 45, so that the energizing current increases and the armature 4 moves upwardly against the bias of the spring 19, and accordingly the spherical valve head 2 is lifted off its seat 8.

In FIG. 2 a graph actually recorded for a device of the kind according to FIG. 1 is illustrated. The abscissae indicate the compression of the spring 19 in millimetres, and the ordinates indicate the corresponding spring force in kilograms. The thin line part of this spring characteristic extends from the origin to the pre-loading point Po. When the spherical valve head 2 rests on its seat 8, the spring has accordingly been compressed by 7 millimetres by screwing the regulating plug 18 into the tapped screw thread 17, corresponding to a spring force of 18 kilograms. It is clear that the pre-loading of the spring is chosen in accordance with the pressure of the fluid.

The thick line part of the spring characteristic indicates the working range. The maximum compression of the spring amounts to 23 millimetres, corresponding to a valve up-stroke of 23 minus 7 equals 16 millimetres, and to a maximum spring force of 54 kilograms. The valve head 2 naturally adjusts itself at any time in such a manner that the spring force and the magnetic force (as well as the comparatively small hydraulic forces) are in equilibrium with one another. On the test rig a linear functional relationship between the energizing current and the spring force was established, so that the energizing current has been represented simply on a second ordinate scale on the right hand side of FIG. 2.

It should be remarked, that the valve 1 is fully controlled already by a temperature difference of ½° C., i.e. that the valve 1 is fully opened at a temperature exceeding the limit value by ½° C., while being fully closed at the limit temperature itself (or any temperature below the same). The solenoid coil 15 had 10,000 turns of copper wire. The number of ampere-turns varied accordingly in the working range between 800 and 2000. The valve head 2 remained quietly stationary at any position within the working range, i.e. in a stable equilibrium corresponding to the actual temperature.

While I have described herein and illustrated in the accompanying drawing what may be considered a typical and particularly useful embodiment of my said invention, I wish it to be understood, that I do not limit myself to the particular details and dimensions described and illustrated; for obvious modifications will occur to a person skilled in the art.

What I claim as my invention and desire to secure by Letters Patent, is:

1. A temperature regulating system comprising: a temperature-sensitive resistor the resistance of which varies in response to variations in the temperature to be regulated; a substantially balanced bridge circuit, said resistor being included in one of the arms thereof, said bridge circuit providing an output signal which varies in direction and magnitude in accordance with the deviation of said regulated temperature from a predetermined reference temperature; amplifier means having an input connected to said bridge circuit for amplifying said output signal; a solenoid valve for controlling the flow of a heat transfer medium to vary said regulated temperature, said valve comprising a hollow cylindrical operating winding connected to the output of said amplifier means for response to the amplified output signal of said bridge circuit; a magnetizable cylindrical plunger member axially movably disposed within said winding coaxially therewith for magnetization thereby; a fixed cylindrical magnetizable member disposed within said winding coaxially therewith for magnetization thereby, said plunger member and said fixed member having confronting end faces, one of said end faces having an integrally formed annular extension projecting axially therebeyond coaxially therewith, said extension being defined by a surface of revolution about the longitudinal axis of said coil generated by a regular iscosceles trapezoid convergent toward the other end face with an angle of convergence within the range from 20°–30°, the other end face having an annular recess formed therein of configuration complementary to said extension for receiving said extension therein; a movable valve member included in said solenoid valve, said valve member being connected directly to said plunger member for displacement therewith; fluid impermeable effectively frictionless bellows means interposed between said winding and said valve member for preventing fluid flow therebetween; a valve seat cooperating with said valve member for regulating fluid flow through said solenoid valve; and spring means yieldingly urging said valve member to engage said seat to shut off said solenoid valve, said spring means being pre-biased to hold said solenoid valve closed at all times when said bridge circuit provides an output signal not exceeding a predetermined minimum value, said spring means, said magnetizable members, said operating winding, said bridge circuit and said temperature-sensitive resistor being dimensioned to provide a stable linear relationship between the magnitude of the output of said bridge circuit and the displacement of said valve member.

2. A temperature control system according to claim 1, wherein said amplifier means comprises a cascaded series of transistors.

3. A temperature control system according to claim 1, wherein the cooperating portions of said valve member and said valve seat are of complementary spherical configurations the centers of which lie on the longitudinal axis of said operating winding.

4. A control system according to claim 1, wherein said spring means is formed of stacked spring washers.

References Cited in the file of this patent

UNITED STATES PATENTS

| | | |
|---|---|---|
| 1,734,257 | Kraft et al. | Nov. 5, 1929 |
| 1,952,571 | Smith | Mar. 27, 1934 |
| 2,402,732 | Cohen | June 25, 1946 |
| 2,407,963 | Persons | Sept. 17, 1946 |
| 2,708,110 | Clay | May 10, 1955 |
| 2,949,237 | De Wilde | Aug. 16, 1960 |
| 2,954,530 | Haskell | Sept. 27, 1960 |
| 2,975,976 | Smith et al. | Mar. 21, 1961 |
| 2,979,643 | De Wilde et al. | Apr. 11, 1961 |
| 3,098,635 | Delaporte et al. | July 23, 1963 |